US012619775B2

(12) United States Patent
Lin et al.

(10) Patent No.: US 12,619,775 B2
(45) Date of Patent: May 5, 2026

(54) METHOD, DEVICE AND COMPUTER PROGRAM PRODUCT FOR DATA SIMULATION BASED ON GENERATED DATA PATTERN

(71) Applicant: EMC IP Holding Company LLC, Hopkinton, MA (US)

(72) Inventors: Aaron Chao Lin, Chengdu (CN); Simon Yuting Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1322 days.

(21) Appl. No.: 16/866,808

(22) Filed: May 5, 2020

(65) Prior Publication Data

US 2021/0182458 A1 Jun. 17, 2021

(30) Foreign Application Priority Data

Dec. 13, 2019 (CN) .......................... 201911286175.2

(51) Int. Cl.
*G06F 21/62* (2013.01)
*G06F 18/21* (2023.01)
(Continued)

(52) U.S. Cl.
CPC ........ *G06F 21/6254* (2013.01); *G06F 18/214* (2023.01); *G06F 18/241* (2023.01);
(Continued)

(58) Field of Classification Search
CPC .. G06F 21/6254; G06F 18/214; G06F 18/241; G06F 21/60; G06F 30/27;
(Continued)

(56) References Cited

U.S. PATENT DOCUMENTS 10,539,881 B1 * 1/2020 Sha ..................... G03F 7/70433
2016/0112274 A1 4/2016 Biem et al.
(Continued)

FOREIGN PATENT DOCUMENTS

CN 109284280 A 1/2019
CN 109409419 A 3/2019
CN 109858625 A 6/2019

OTHER PUBLICATIONS

Gao et al.—Join operations in temporal databases (Year: 2005).*
(Continued)

*Primary Examiner* — Van C Mang
(74) *Attorney, Agent, or Firm* — WOMBLE BOND DICKINSON (US) LLP

(57) ABSTRACT

According to example embodiments of the present disclosure, a method, device and computer program product for data simulation are proposed. The method for data simulation includes: obtaining first data pattern information that is associated with a first set of operations executed on real data in a data protection system; generating, based on the first data pattern information, second data pattern information that is associated with a second set of operations executable by the data protection system; and generating, based on the second data pattern information, simulation data different from the real data, for the data protection system to execute the second set of operations on the simulation data. Thereby, the present solution can simulate efficiently and reliably a data pattern of real data, and thus generating simulation data of a data pattern similar to that of the real data.

18 Claims, 8 Drawing Sheets

200

(51) Int. Cl.

| | |
|---|---|
| *G06F 18/214* | (2023.01) |
| *G06F 18/24* | (2023.01) |
| *G06F 18/241* | (2023.01) |
| *G06F 21/60* | (2013.01) |
| *G06F 30/27* | (2020.01) |
| *G06N 3/045* | (2023.01) |
| *G06N 3/08* | (2023.01) |
| *G06N 20/20* | (2019.01) |

(52) U.S. Cl.
CPC .............. *G06F 21/60* (2013.01); *G06F 30/27* (2020.01); *G06N 3/045* (2023.01); *G06N 3/08* (2013.01); *G06N 20/20* (2019.01)

(58) Field of Classification Search
CPC .......... G06F 30/20; G06N 3/045; G06N 3/08; G06N 20/20; G06N 3/088
See application file for complete search history.

(56) References Cited

U.S. PATENT DOCUMENTS

| | | | |
|---|---|---|---|
| 2016/0359878 A1* | 12/2016 | Prasad | ................... H04L 43/20 |
| 2018/0060452 A1 | 3/2018 | Esterkin et al. | |

OTHER PUBLICATIONS

Creswell et al.—Generative Adversarial Networks: An Overview (Year: 2017).*
Wang et al. "Cassini's Test Methodology for Flight Software Verification and Operations", (Year: 2007).*
Wu, "Privacy-Protective-GAN for Face De-identification", 2018 (Year: 2018).*
Xu, "GANobfuscator: Mitigating Information Leakage Under GAN via Differential Privacy" 2019 (Year: 2019).*

* cited by examiner

100

120
COMPUTING DEVICE

140
SECOND DATA PATTERN INFORMATION

150
SIMULATION DATA

110
DATA PROTECTION SYSTEM

130
FIRST DATA PATTERN INFORMATION

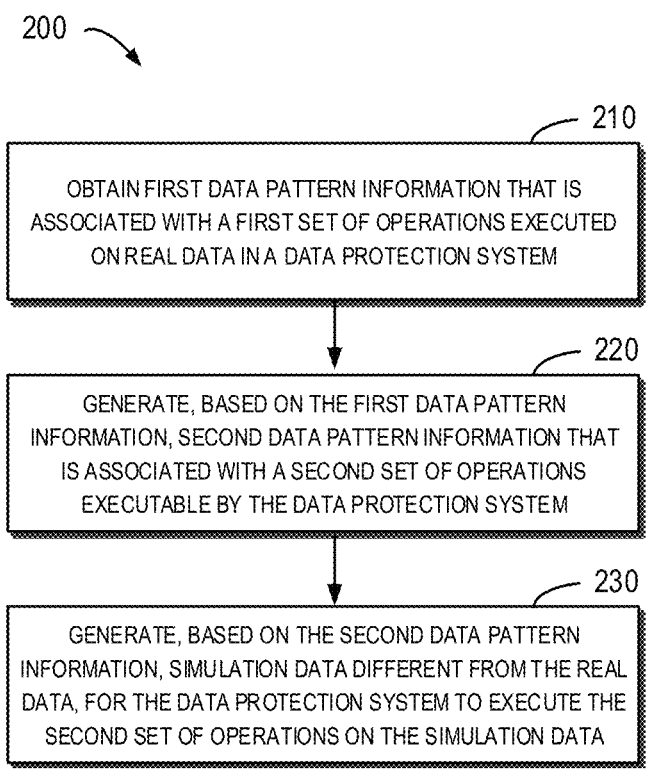

200

210

OBTAIN FIRST DATA PATTERN INFORMATION THAT IS ASSOCIATED WITH A FIRST SET OF OPERATIONS EXECUTED ON REAL DATA IN A DATA PROTECTION SYSTEM

220

GENERATE, BASED ON THE FIRST DATA PATTERN INFORMATION, SECOND DATA PATTERN INFORMATION THAT IS ASSOCIATED WITH A SECOND SET OF OPERATIONS EXECUTABLE BY THE DATA PROTECTION SYSTEM

230

GENERATE, BASED ON THE SECOND DATA PATTERN INFORMATION, SIMULATION DATA DIFFERENT FROM THE REAL DATA, FOR THE DATA PROTECTION SYSTEM TO EXECUTE THE SECOND SET OF OPERATIONS ON THE SIMULATION DATA

| EXECUTION TIME | OPERATION PARAMETER |
|---|---|

400

500

700

METHOD, DEVICE AND COMPUTER PROGRAM PRODUCT FOR DATA SIMULATION BASED ON GENERATED DATA PATTERN

CROSS-REFERENCE TO RELATED APPLICATION

This patent application claims priority, under 35 U.S.C. § 119, of Chinese Patent application Ser. No. 20/191, 1286175.2, filed Dec. 13, 2019, which is incorporated by reference in its entirety.

FIELD

Embodiments of the present disclosure generally relate to computer technologies, and more specifically, to a method, device and computer program product for data simulation.

BACKGROUND

A data pattern is of great importance to a data protection system, which reflects operations performed on data in the data protection system. For example, in a stress testing, the Quality Assurance team needs a data pattern similar to the user scenario to verify the performance of the data protection system. In addition, the support/sales team needs the data pattern to compare the data protection system with competitors' data protection systems, to prove the advantages of its data protection system. Therefore, the data pattern needs to be obtained efficiently and reliably.

SUMMARY

Embodiments of the present disclosure provide a method, device and computer program product for data simulation.

In a first aspect, a method for data simulation is proposed. The method comprises: obtaining first data pattern information that is associated with a first set of operations executed on real data in a data protection system; generating, based on the first data pattern information, second data pattern information that is associated with a second set of operations executable by the data protection system; and generating, based on the second data pattern information, simulation data different from the real data, for the data protection system to execute the second set of operations on the simulation data.

In a second aspect of the present disclosure, an electronic device is proposed. The device comprises at least one processing unit and at least one memory. The at least one memory is coupled to the at least one processing unit and stores instructions executed by the at least one processing unit. The instructions, when executed by the at least one processing unit, cause the device to execute acts comprising: obtaining first data pattern information that is associated with a first set of operations executed on real data in a data protection system; generating, based on the first data pattern information, second data pattern information that is associated with a second set of operations executable by the data protection system; and generating, based on the second data pattern information, simulation data different from the real data, for the data protection system to execute the second set of operations on the simulation data.

In a third aspect of the present disclosure, a computer program product is proposed. The computer program product is tangibly stored on a non-transitory computer-readable medium and includes machine executable instructions which, when executed, cause a machine to execute steps of the method as described in accordance with the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings in which the same reference symbols generally refer to the same elements.

FIG. 2 illustrates a flowchart of a method for simulation according to some embodiments of the present disclosure;

Throughout the drawings, the same or similar reference symbols refer to the same or similar elements.

DETAILED DESCRIPTION OF EMBODIMENTS

Figure 1:
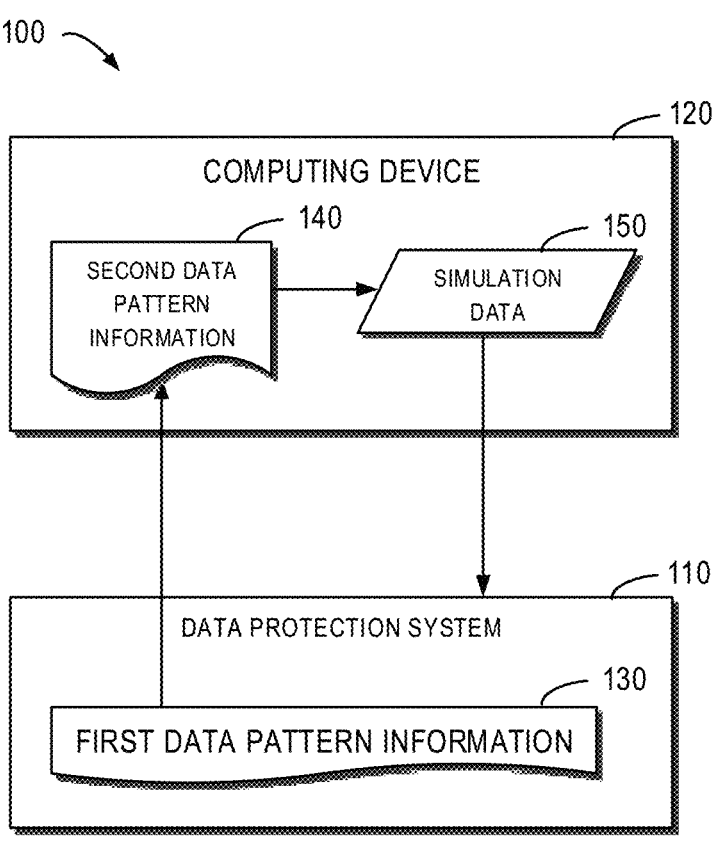
FIG. 1 illustrates a schematic diagram of an example of a simulation environment according to some embodiments of the present disclosure.

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

As aforementioned, a data pattern is of great importance to a data protection system. However, in some circumstances, users (in particular, users having sensitive data such as banks, governments, and the like) do not want to share their data. Even though the users permit sharing some data (e.g., some data related to performance improvement), the volume of the shared data may not be sufficient to reflect the data pattern underlying the data. Therefore, it is hard to test the data protection system.

If the data pattern is generated randomly, it is useless, because all user data patterns have their own different characteristics due to different industries. Even in the same industry, the data patterns have their own characteristics due to different companies, time, locations and the like. For example, a data pattern of a bank database is totally different from a data pattern of university office documents in size, change rate, deduplication ratio, segment size, and the like.

As such, simulation data with characteristics of a user's data pattern needs to be obtained. Traditionally, simulation data may be obtained from two approaches. On one hand, data may be obtained directly from a user. Such data may reflect the characteristics of the user's data pattern. However, as stated above, the user is unwilling to share data due to the data sensitivity, or the volume of the shared data is not enough to reflect the data pattern underlying the data.

On the other hand, existing tools can generate simulation data with a predictable change rate through specified parameters (e.g., data size, data change rate, changed block size, and the like). However, these parameters need to be input manually by engineers, incurring substantial waste of human resources. In addition, these parameters highly depend on experience of engineer, but there is a big gap between the real user scenario and the engineers' perspectives. In this case, the simulation data often lacks characteristics of the user's data pattern. As a result, the simulation data generated by existing tools is more suitable for feature validation of the data protection systems, but not suitable for stress testing or comparison for competitors' data protection systems. Such simulation data is obviously not ideal.

Furthermore, with the rapid growth of data size, the complexity of the data pattern also quickly increases, and as a result, neither the above-mentioned two approaches are suitable for modern data protection systems. In most circumstances, users do not want to share their data, not only due to data sensitivity, but also because the volume of data is too large. Moreover, the increasing complexity of data patterns also makes it impossible for existing tools to generate simulation data to reflect the real user/industry scenario, considering the parameters must be manually input by engineers.

According to example embodiments of the present disclosure, an improved solution for data simulation is proposed. In the solution, first data pattern information is obtained. The first data pattern information is associated with a first set of operations executed on real data in a data protection system. Second data pattern information is generated based on the first data pattern information. The second data pattern information is associated with a set of operations executable by the data protection system. Thereby, simulation data different from the real data may be generated based on the second data pattern information, for the data protection system to execute the second set of operations on the simulation data.

In this way, even the users share no real data or only few real data, the data pattern information of the real data may be obtained, to generate simulation data pattern information truly reflecting the data pattern of the real data. The simulation data pattern information may be further converted into simulation data with the discovered data pattern, to fulfill the needs for the engineering and support/sales teams.

Reference will now be made to FIGS. 1-8 to describe specific examples of the present solution in detail. FIG. 1 illustrates a schematic diagram of an example of a simulation environment 100 according to some embodiments of the present disclosure. The simulation environment 100 includes a data protection system 110 and a computing device 120. The data protection system 110 may be used for data protection, such as backup, recovery, replication, and the like. According to embodiments of the present disclosure, the data protection system 110 may record operations impacting the performance of the data protection system 110 (in particular, the performance with respect to backup, recovery, replication, and the like) involved during data protection. For example, statistical information on a deduplication operation, a write operation, a synthesis operation, and the like, can be recorded. The statistical information may be used as first data pattern information 130.

The computing device 120 may be any device having a computing capability including, but not limited to, a cloud computing device, a large scale computer, a personal computer, a desktop computer, a laptop computer, a tablet computer, a personal digital assistant, and the like. According to embodiments of the present disclosure, the computer device 120 is configured to obtain the first data pattern information 130, and generate second data pattern information 140 for simulating the first data pattern information 130. The second data pattern information 140 may reflect a data pattern underlying the data, and thus the computing device 120 may generate, based on the second data pattern information 140, simulation data having a similar data pattern to that of the real data for the data protection system 110. The engineering team may perform stress tests on the data protection system 110 using the simulation data, while the sales or support team may make competitive analysis on the data protection system 110 using the simulation data.

In this way, the present solution can easily set up an environment with a similar data pattern to the user's data pattern by collecting data pattern information of real data, rather than the real data per se, without using user-sensitive real data, such that the performance of a data protection system can be optimized with the assistance of reliable simulation data. Generating simulation data is advantageous for setting up a testing environment for an engineering team and a competitive analysis environment for a sales or support team.

Hereinafter, reference will be made to FIGS. 2-7 to describe in more detail simulation of a data pattern and data. FIG. 2 illustrates a flowchart of a method 200 for simulation according to some embodiments of the present disclosure. The method 200, for example may be implemented by the computing device 120 as shown in FIG. 1. For ease of discussion, the method 200 will be described below with reference to FIG. 1. It would be appreciated that the method 200 may further include additional steps not shown and/or may skip the steps as shown, and the scope of the present application is not limited in this aspect.

At 210, the computing device 120 obtains the first data pattern information 130. The first data pattern information 130 is associated with a first set of operations executed on the real data in the data protection system 110, and reflects the data pattern of the real data. In the same hardware environment, data pattern is critical. The real data, irrespective of its type (e.g., video files, database files or text files), is just data for the data protection system 110. Therefore, as long as the real data follows a similar pattern, it may have similar performance to some extent. Although some data from specific plugins can utilize optimization from the plugin side, the raw data reserved in the data protection system 110 still follows some data pattern.

In some embodiments, the first set of operations may include operations (e.g., a deduplication operation, write operation, synthesis operation and the like) impacting the performance of the data protection system 110 involved when the data protection system 110 is protecting the data. The principle lies in that the data protection system 100 can utilize the data deduplication technology. In the deduplication technology, two main factors are included, namely deduplication rate and throughput ratio. These two factors determine the performance of the data protection system, and the operations involving the two factors include deduplication operations, write operations, synthesis operations, and the like.

How the first data pattern information 130 is generated will be described below. In some embodiments, the computing device 120 may obtain a value of an operation parameter applied in the first set of operations, and generate the first data pattern information 130 based on the value of the operation parameter. Alternatively, when the computing device 120 directly obtains the first data pattern information 130 from the data protection system 110, generating the first data pattern information 130 is performed by the data protection system 110.

The selected operation parameters follow two conditions. On one hand, as stated above, considering that the first set of operations may impact the performance of the data protection system 110, the operation parameters applied in the first set of operations should be those impacting the performance of the data protection system 110.

On the other hand, the values of these operation parameters can be collected when the data protection system 110 performs data processing (e.g., backup, recovery, replication, and the like), without incurring extra costs to the performance of the data protection system 110, just like log information. For example, the data protection system 110, as an inline data protection system using a deduplication technology, handles all operations impacting the performance of the data protection system 110 involved during data protection, and therefore may collect the values of the operation parameters without touching the sensitive real data. For each operation, the operation parameters such as offset, length, time, and the like can be all recorded into a statistics file as the first data pattern information 130. The size of the first data pattern information 130 is not relevant to the size of the real data, but mainly dependent on the complexity of the data pattern, for example, from several KBs to MBs.

In view of the above, one or more operation parameters impacting the performance of the data protection system 110 involved during data protection and without incurring extra costs may include: for a deduplication operation, a pre-deduplication size, a post-deduplication size, a pre-compression size, a post-compression size, a number of segments, and network bytes; for a write operation, a number of write requests, a write size, a number of write regions, write region statuses, a write offset, and write bytes per second; and for a synthesis operation, a number of synthesis requests, a synthesis size, a number of synthesis regions, synthesis region statuses, a synthesis offset, and synthesis bytes per second.

More specifically, the pre-deduplication size, post-deduplication size, pre-compression size, post-compression size, number of segments, and network bytes refer to a size of data volume being pre-deduplicated, a size of data volume being post-deduplicated, a size of data volume being pre-compressed, a size of data volume being post-compressed, a number of data segments, and a number of bytes of data transmitted over the network when performing the deduplication operation, respectively.

The number of write requests, write size, number of write regions, write region statuses, write offset, and write bytes per second refer to a number of write requests received when performing a write operation, a size of data volume written, a number of regions for write, statuses of regions for write, an offset amount of written data, and a number of bytes of data volume written per second, respectively.

The number of synthesis requests, synthesis size, number of synthesis regions, synthesis region statuses, synthesis offset, and synthesis bytes per second refer to a number of synthesis requests received when performing a synthesis operation, a size of data volume synthesized, a number of regions for synthesis, statuses of regions for synthesis, an offset amount of synthesized data, and a number of bytes of data volume synthesized per second, respectively.

Figure 3:
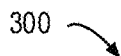
FIG. 3 illustrates a schematic diagram of sorting a set of operations based on execution time according to some embodiments of the present disclosure.

In addition, each operation in the first set of operations, for example in a backup, recovery or replication process, may be recorded in a time sequence, for rebuilding simulation data following a similar data pattern. To this end, in some embodiments, the computing device 120 may sort each operation in the first set of operations according to the execution time, and obtain values of operation parameters for the sorted first set of operations. For example, FIG. 3 illustrates a schematic diagram 300 of a set of operations sorted in execution time according to some embodiments of the present disclosure. FIG. 3 shows some example operations sorted in execution time, and lists a value of an operation parameters corresponding to each operation.

Figure 4:
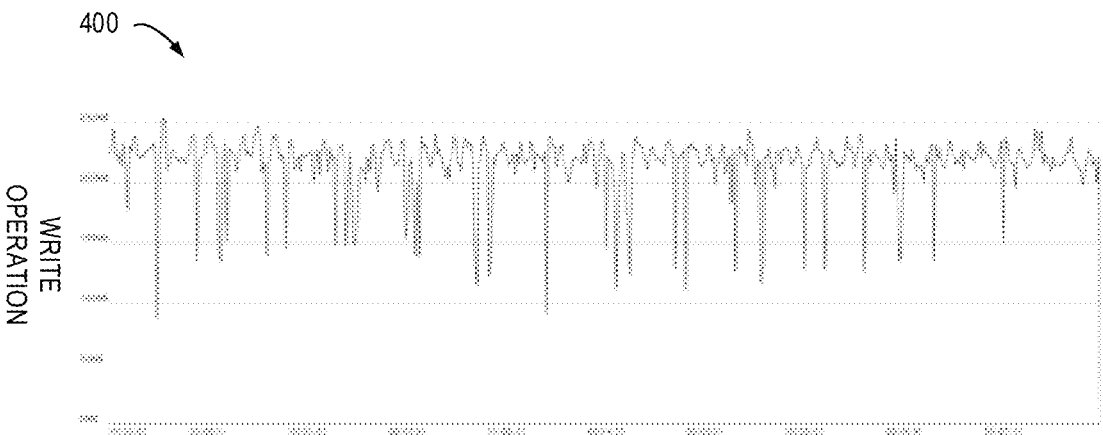
FIG. 4 illustrates a schematic diagram of a visualized representation of a write operation according to some embodiments of the present disclosure.
Figure 5:
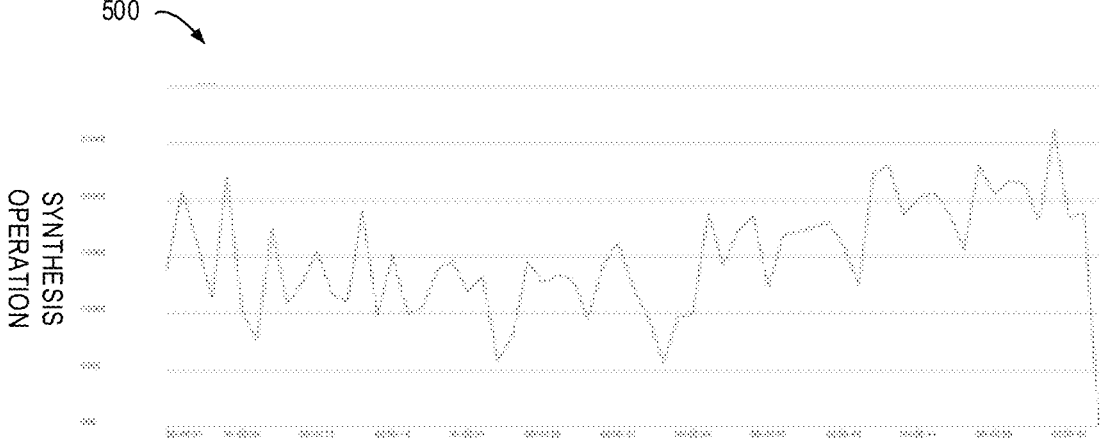
FIG. 5 illustrates a schematic diagram of a visualized representation of a synthesis operation according to some embodiments of the present disclosure.

Optionally, the computing device 120 may include the first data pattern information 130 or a part thereof in a visualized representation, which facilitates the engineering, sales and support teams understanding the data pattern underlying the real data. FIGS. 4 and 5 are schematic diagrams 400 and 500 illustrating respective visual representations of a write operation and a synthesis operation, in which the horizontal axis represents time, and the vertical axis represents data volume of the write operation or the synthesis operation.

It would be appreciated that the list of a series of operations as shown in FIG. 3 and the visualized representations in FIGS. 4 and 5 are illustrative. The execution times of operations, the values of the operation parameters, and the visualized representations may be varied with the specific conditions of the executed operations, so as to represent the operations in an appropriate manner. The scope of the embodiments of the present disclosure is not limited in this aspect.

Continuing to refer to FIG. 2, at 220, the computing device 120 generates the second data pattern information 140 based on the first data pattern information 130. The second data pattern information 140 simulates the first data pattern information 130, and is associated with a second set of operations executable by the data protection system 110. Since the second data pattern information 140 simulates the first data pattern information 130, the second set of operations are similar to the first set of operations, which may include operations impacting the performance of the data protection system 110 involved during data protection, such as a duduplication operation, write operation, synthesis operation, and the like.

The computing device 120 may generate the data pattern information 140 in a variety of ways. In some embodiments, in order to generate the second data pattern information 140, the computing device 120 may utilize a neural network, for example, a Generative Adversarial Network (GAN). The GAN includes two neural networks competing with each other, namely a generator and a discriminator. The generator obtains random noise and tries to generate simulation data similar to the input real data. The discriminator receives the real data and the simulation data generated in the generator, and tries to distinguish the real data from the simulation data. Thus, in the learning process, the generator becomes more and more skillful in generating the simulation data, while the discriminator gets better in classification of real data and simulation data.

Figure 6:
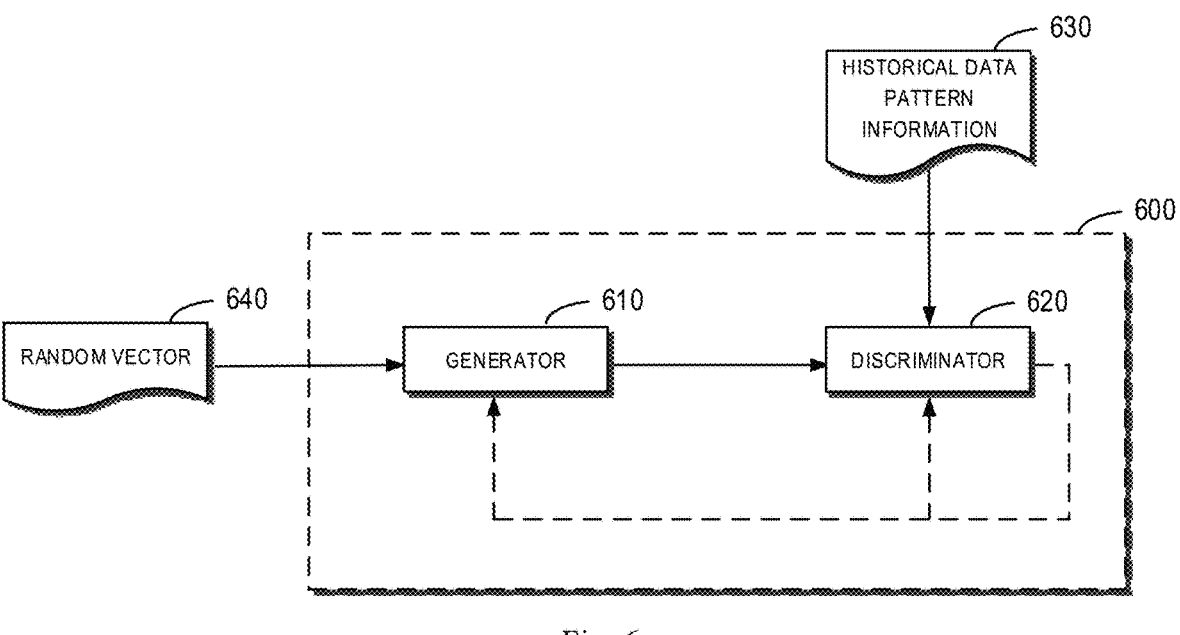
FIG. 6 illustrates a schematic diagram of an example of training a generative adversarial network according to some embodiments of the present disclosure.

For a better understanding on the GAN, a brief introduction on training the GAN will be provided below. FIG. 6 illustrates a schematic diagram of training a GAN 600 according to some embodiments of the present disclosure. The training of the GAN 600 may be performed by an external computing device, server, edge computing node or the like, or may be performed by the computing device 120. For the sake of discussion, the training of the GAN 600 will be described as being performed by the computing device 120 below.

As shown in FIG. 6, the computing device 120 may apply a random vector 640 to a generator 610 to generate candidate data pattern information with a first label. The first label indicates that the candidate data pattern information is simulated. In addition, the computing device 120 may apply historical data pattern information 630 with a second label and the candidate data pattern information with the first label to a discriminator 620 for discrimination. The second label indicates that the historical data pattern information 630 is real. The historical data pattern information 630 is associated with a set of historical operations executed on the real data in the data protection system 110. Similar to the first data pattern information 130, the historical data pattern information may include operations (e.g., a deduplication operation, write operation, synthesis operation, and the like) impacting the performance of the data protection system 110 when the data protection system 110 is protecting the data.

The reason why the data pattern information should be labeled is that the data pattern information 630 of the real data and the candidate data pattern information generated by the generator 610 are mixed together and then fed to the discriminator 620. In this case, the problem solved by the discriminator 620 is a standard binary classification problem. As such, the historical pattern information 630 may have a second label (e.g., 1) indicating that it is real, while the candidate data pattern information may have a first label (e.g., 0) indicating that it is simulated, to facilitate the training of the discriminator 620.

The computing device 120 may update, based on the result of discrimination executed by the discriminator 620, the generator 610 and the discriminator 620, such that the candidate data pattern information generated by the updated generator 610 is more real and the updated discriminator 620 has a more powerful discriminating ability, until the discriminator 620 cannot discriminate the simulated candidate data pattern information and the real historical pattern information 630.

Figure 7:
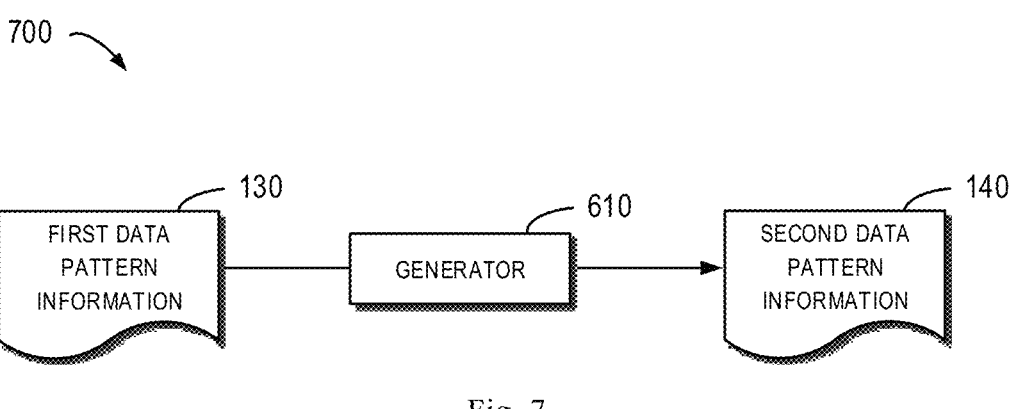
FIG. 7 illustrates a schematic diagram of an example of using a generator of a generative adversarial network according to some embodiments of the present disclosure.

After the training has completed, the generator 610 in the GAN 600 may be deployed in the computing device 120, and may be used by the computing device 120 for data generation. FIG. 7 illustrates a schematic diagram 700 of an example of using the generator 610 according to some embodiments of the present disclosure. As shown in FIG. 7, the computing device 120 may apply the first data pattern information 130 to the trained generator 610, to generate the second data pattern information 140. Since it is hard to determine whether the data pattern information generated by the generator 610 is real or non-real, the second data pattern information 140 highly simulates the first data pattern information 130.

In some embodiments, the computing device 120 may perform, based on a specified classification criterion, classification on the first data pattern information 130, and generate the second data pattern information from the first data pattern information 130 based on a classification result of the first data pattern information. For example, the computing device 120 may perform classification on the first data pattern information 130 according to the user's industry and the data protection process being performed for protecting the data (e.g., a backup, recovery and replication process), so as to divide the first data pattern information 130 into several groups each of which may be used in a single training of the GAN 600.

Returning to FIG. 2, after the second data pattern information 140 has been generated, at 230, the computing device 120 generates, based on the second data pattern information 140, simulation data 150 different from the real data, for the data protection system 110 to execute a second set of operations on the simulation data 150. The simulation data 150 may be partly or wholly different from the real data but follows a similar data pattern, and therefore may be used for some related analysis on the data protection system 110, such as stress testing, analysis on competitive products, and the like. In this way, the present solution can remarkably improve the generation of the simulation data. As discussed above, input parameters of data generation tools typically depend on engineers' experience and are input manually by them, and thus the traditional solution has disadvantages of being inaccurate and time consuming. However, since the second data pattern information 140 is generated automatically by a well-trained GAN, the present solution is accurate and intelligent.

In the present disclosure, the collecting of the data pattern information of the real data is integrated into daily backup, recovery and replication of the data protection system, and thus avoiding touching users' sensitive data. The present solution utilizes the collected data pattern information for training a GAN, to obtain typical data patterns directed to different industries, different users, and the like, so as to avoid manual intervention. It can be seen that this solution is inline, automatic and intelligent, and therefore can provide massive and precise simulation data for performance optimization and comparison.

Figure 8:
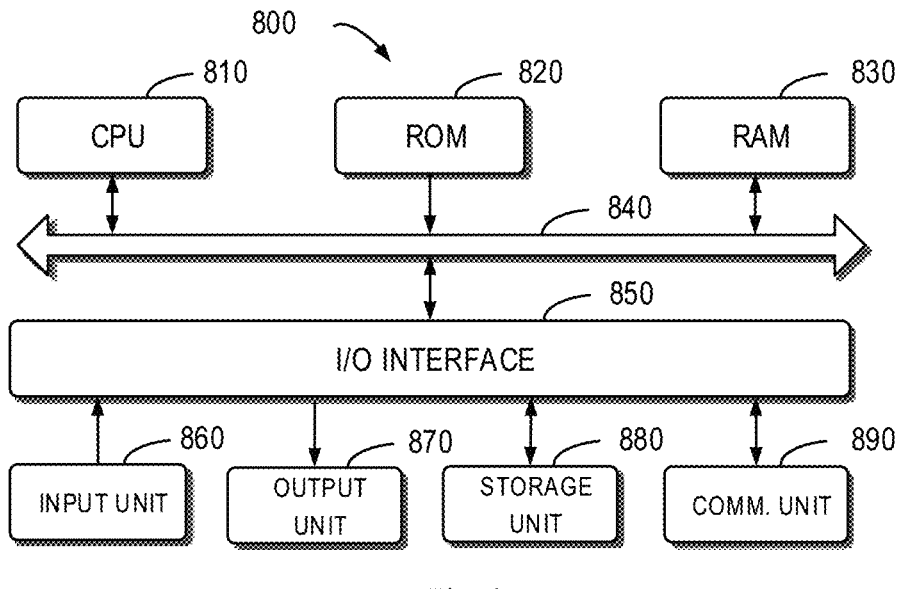
FIG. 8 illustrates a schematic block diagram of an example device that can be used to implement embodiments of the present disclosure.

FIG. 8 illustrates a block diagram of an example device 800 that may be used to implement embodiments of the present disclosure. For example, the computing device 120 as shown in FIG. 1 may be implemented by the device 800. As shown, the device 800 includes a central processing unit (CPU) 810 which performs various appropriate acts and processing, based on computer program instructions stored in a read-only memory (ROM) 820 or computer program instructions loaded from a storage unit 880 to a random access memory (RAM) 830. The RAM 830 stores therein various programs and data required for operations of the device 800. The CPU 810, the ROM 820 and the RAM 830 are connected via a bus 840 with one another. An input/output (I/O) interface 850 is also connected to the bus 840.

The following components in the device 800 are connected to the I/O interface 850: an input unit 860 such as a keyboard, a mouse and the like; an output unit 870 including various kinds of displays and a loudspeaker, etc.; a storage unit 880 including a magnetic disk, an optical disk, and etc.; a communication unit 890 including a network card, a modem, and a wireless communication transceiver, etc. The communication unit 890 allows the device 800 to exchange information/data with other devices through a computer network such as the Internet and/or various kinds of telecommunications networks.

Various processes and processing described above, e.g., the method 200, may be executed by the processing unit 810. For example, in some embodiments, the method 200 may be implemented as a computer software program that is tangibly included in a machine-readable medium, e.g., the storage unit 880. In some embodiments, part or all of the computer programs may be loaded and/or mounted onto the device 800 via ROM 820 and/or communication unit 890. When the computer program is loaded to the RAM 830 and executed by the CPU 810, one or more acts of the method 200 as described above may be performed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card and/or network interface in each computing/processing device receive computer-readable program instructions from the network and forward the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing status information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer readable storage medium that can direct a computer, a programmable data processing device, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of using a generative adversarial network (GAN) to improve simulation data of a data protection system, comprising:

collecting a plurality of sets of historical data pattern information associated with real training data in the data protection system, each of the plurality of sets of historical data pattern information comprising a respective set of operations executed on a respective portion of the real training data in the data protection system, each of the respective sets of operations comprising a respective set of values for operation parameters collected during performance of the respective set of operations on the respective portion of the real training data, and each respective set of values includes a respective data pattern of the respective portion of the real training data;

applying a first label to each set of historical data pattern information the first label indicating the plurality of sets of historical data pattern information are real;

providing the historical data pattern information to the GAN for training of the GAN, wherein the GAN includes a generator comprising a first neural network and a discriminator comprising a second neural network, wherein training the GAN includes:

generating, via the generator, a plurality of sets of simulated data pattern information based on random noise, each of the plurality of sets of simulated data pattern information generated with a first label indicating the sets of simulated data pattern information are simulated, providing a mix of the sets of historical data pattern information and the sets of simulated data pattern information to the discriminator, producing a result of discrimination based on classification, via the discriminator, of each set of the mix of the sets of historical data pattern information and the sets of simulated data pattern information to the discriminator, and creating a trained generator of the GAN and a trained discriminator of the GAN based on the result of discrimination, wherein the trained discriminator is unable to discriminate simulated data pattern information generated by the trained generator from the historical data pattern information;

collecting, by a processor, first data pattern information that is associated with a first set of operations executed on real data in the data protection system, the first data pattern information comprising values for operation parameters collected during performance of the first set of operations in the data protection system, and the first data pattern information including a data pattern of the real data;

generating, by the processor via the trained generator of the GAN, second data pattern information that simulates the first data pattern information and reflects the data pattern of the real data, the second data pattern information associated with a second set of operations executable by the data protection system utilizing the GAN, the second set of operations being different than the first set of operations, and wherein the generating, by the processor, based on the first data pattern information, the second data pattern information comprising:

applying the first data pattern information to the trained generator of the GAN; to generate the second data pattern information as a simulation of the first data pattern information; and converting, by the processor, the second data pattern information into simulation data different from the real data, the simulation data reflecting the data pattern of the real data that the first set of operations were executed on in the data protection system, and the simulation data for the data protection system to execute the second set of operations on the simulation data.

2. The method of claim 1, wherein the first set of operations and the second set of operations include at least one of the following, respectively:

a deduplication operation;

a write operation; or a synthesis operation.

3. The method of claim 1, wherein obtaining the first data pattern information comprises:

obtaining a value of an operation parameter applied in the first set of operations; and generating, based on the value of the operation parameter, the first data pattern information.

4. The method of claim 3, wherein obtaining the value of the operation parameter comprises:

sorting each operation in the first set of operations based on execution time; and obtaining the value of the operation parameter for each operation in the sorted first set of operations.

5. The method of claim 3, wherein obtaining the value of the operation parameter comprising obtaining a value of at least one of the following: a pre-deduplication size, a post-deduplication size, a pre-compression size, a post-compression size, a number of segments, network bytes, a number of write requests, a write size, a number of write regions, write region statuses, a write offset, write bytes per second, a number of synthesis requests, a synthesis size, a number of synthesis regions, synthesis region statuses, a synthesis offset, and synthesis bytes per second.

6. The method of claim 1, wherein generating the second data pattern comprises:

executing, based on a specified classification criterion, classification on the first data pattern information; and generating, based on a classification result of the first data pattern information, the second data information from the first data pattern information.

7. An electronic device, comprising:

at least one processing unit; and at least one memory coupled to the at least one processing unit and storing instructions, which when executed by the at least one processing unit, causing the at least one processing unit to perform operations, the operations comprising:

collecting a plurality of sets of historical data pattern information associated with real training data in the data protection system, each of the plurality of sets of historical data pattern information comprising a respective set of operations executed on a respective portion of the real training data in the data protection system, each of the respective sets of operations comprising a respective set of values for operation parameters collected during performance of the respective set of operations on the respective portion of the real training data, and each respective set of values includes a respective data pattern of the respective portion of the real training data;

applying a first label to each set of historical data pattern information the first label indicating the plurality of sets of historical data pattern information are real;

providing the historical data pattern information to the GAN for training of the GAN, wherein the GAN includes a generator comprising a first neural network and a discriminator comprising a second neural network, wherein training the GAN includes:

generating, via the generator, a plurality of sets of simulated data pattern information based on random noise, each of the plurality of sets of simulated data pattern information generated with a first label indicating the sets of simulated data pattern information are simulated, providing a mix of the sets of historical data pattern information and the sets of simulated data pattern information to the discriminator, producing a result of discrimination based on classification, via the discriminator, of each set of the mix of the sets of historical data pattern information and the sets of simulated data pattern information to the discriminator, and creating a trained generator of the GAN and a trained discriminator of the GAN based on the result of discrimination, wherein the trained discriminator is unable to discriminate simulated data pattern information generated by the trained generator from the historical data pattern information;

collecting first data pattern information that is associated with a first set of operations executed on real data in the data protection system, the first data pattern information comprising values for operation parameters collected during performance of the first set of operations in the data protection system, and the first data pattern information including a data pattern of the real data;

generating, via the trained generator of the GAN, second data pattern information that simulates the first data pattern information and reflects the data pattern of the real data, the second data pattern information associated with a second set of operations executable by the data protection system utilizing the GAN, the second set of operations being different than the first set of operations, and wherein the generating based on the first data pattern information, the second data pattern information comprising:

applying the first data pattern information to the trained generator of the GAN; to generate the second data pattern information as a simulation of the first data pattern information;

converting the second data pattern information into simulation data different from the real data, the simulation data reflecting the data pattern of the real data that the first set of operations were executed on in the data protection system, and the simulation data for the data protection system to execute the second set of operations on the simulation data.

8. The device of claim 7, wherein the first set of operations and the second set of operations include at least one of the following, respectively:

a deduplication operation;

a write operation; or a synthesis operation.

9. The device of claim 7, wherein obtaining the first data pattern information comprises:

obtaining a value of an operation parameter applied in the first set of operations; and generating, based on the value of the operation parameter, the first data pattern information.

10. The device of claim 9, wherein obtaining the value of the operation parameter comprises:

sorting each operation in the first set of operations based on execution time; and obtaining the value of the operation parameter for each operation in the sorted first set of operations.

11. The device of claim 9, wherein obtaining the value of the operation parameter comprising obtaining a value of at least one of the following: a pre-deduplication size, a post-deduplication size, a pre-compression size, a post-compression size, a number of segments, network bytes, a number of write requests, a write size, a number of write regions, write region statuses, a write offset, write bytes per second, a number of synthesis requests, a synthesis size, a number of synthesis regions, synthesis region statuses, a synthesis offset, and synthesis bytes per second.

12. The device of claim 7, wherein generating the second data pattern comprises:

executing, based on a specified classification criterion, classification on the first data pattern information; and generating, based on a classification result of the first data pattern information, the second data information from the first data pattern information.

13. A computer program product tangibly stored on a non-transitory computer-readable medium and including machine-executable instructions, which when executed by a machine, cause the machine to:

collecting a plurality of sets of historical data pattern information associated with real training data in the data protection system, each of the plurality of sets of historical data pattern information comprising a respective set of operations executed on a respective portion of the real training data in the data protection system, each of the respective sets of operations comprising a respective set of values for operation parameters collected during performance of the respective set of operations on the respective portion of the real training data, and each respective set of values includes a respective data pattern of the respective portion of the real training data;

applying a first label to each set of historical data pattern information the first label indicating the plurality of sets of historical data pattern information are real;

providing the historical data pattern information to the GAN for training of the GAN, wherein the GAN includes a generator comprising a first neural network and a discriminator comprising a second neural network, wherein training the GAN includes:

generating, via the generator, a plurality of sets of simulated data pattern information based on random noise, each of the plurality of sets of simulated data pattern information generated with a first label indicating the sets of simulated data pattern information are simulated, providing a mix of the sets of historical data pattern information and the sets of simulated data pattern information to the discriminator, producing a result of discrimination based on classification, via the discriminator, of each set of the mix of the sets of historical data pattern information and the sets of simulated data pattern information to the discriminator, and creating a trained generator of the GAN and a trained discriminator of the GAN based on the result of discrimination, wherein the trained discriminator is unable to discriminate simulated data pattern information generated by the trained generator from the historical data pattern information;

collecting first data pattern information that is associated with a first set of operations executed on real data in the data protection system, the first data pattern information comprising values for operation parameters collected during performance of the first set of operations in the data protection system, and the first data pattern information including a data pattern of the real data;

generating, via the trained generator of the GAN, second data pattern information that simulates the first data pattern information and reflects the data pattern of the real data, the second data pattern information associated with a second set of operations executable by the data protection system utilizing the GAN, the second set of operations being different than the first set of operations, and wherein the generating based on the first data pattern information, the second data pattern information comprising:

applying the first data pattern information to the trained generator of the GAN; to generate the second data pattern information as a simulation of the first data pattern information;

converting the second data pattern information into simulation data different from the real data, the simulation data reflecting the data pattern of the real data that the first set of operations were executed on in the data protection system, and the simulation data for the data protection system to execute the second set of operations on the simulation data.

14. The computer program product of claim 13, wherein the first set of operations and the second set of operations include at least one of the following, respectively:

a deduplication operation;

a write operation; or a synthesis operation.

15. The computer program product of claim 13, wherein obtaining the first data pattern information comprises:

obtaining a value of an operation parameter applied in the first set of operations; and generating, based on the value of the operation parameter, the first data pattern information.

16. The computer program product of claim 15, wherein obtaining the value of the operation parameter comprising obtaining a value of at least one of the following: a pre-deduplication size, a post-deduplication size, a pre-compression size, a post-compression size, a number of segments, network bytes, a number of write requests, a write size, a number of write regions, write region statuses, a write offset, write bytes per second, a number of synthesis requests, a synthesis size, a number of synthesis regions, synthesis region statuses, a synthesis offset, and synthesis bytes per second.

17. The computer program product of claim 13, wherein generating the second data pattern comprises:

executing, based on a specified classification criterion, classification on the first data pattern information; and generating, based on a classification result of the first data pattern information, the second data information from the first data pattern information.

18. The method of claim 1, further comprising:

classifying the first data pattern information based on a user industry or a current data protection process to produce a classification result;

selecting the updated generator from a plurality of generators based on the classification result, wherein the plurality of generators corresponds to a plurality of trainings of the GAN.

* * * * *